A. C. MAY.
MICROMETER GAGE.
APPLICATION FILED APR. 11, 1914.
1,133,652.
Patented Mar. 30, 1915.
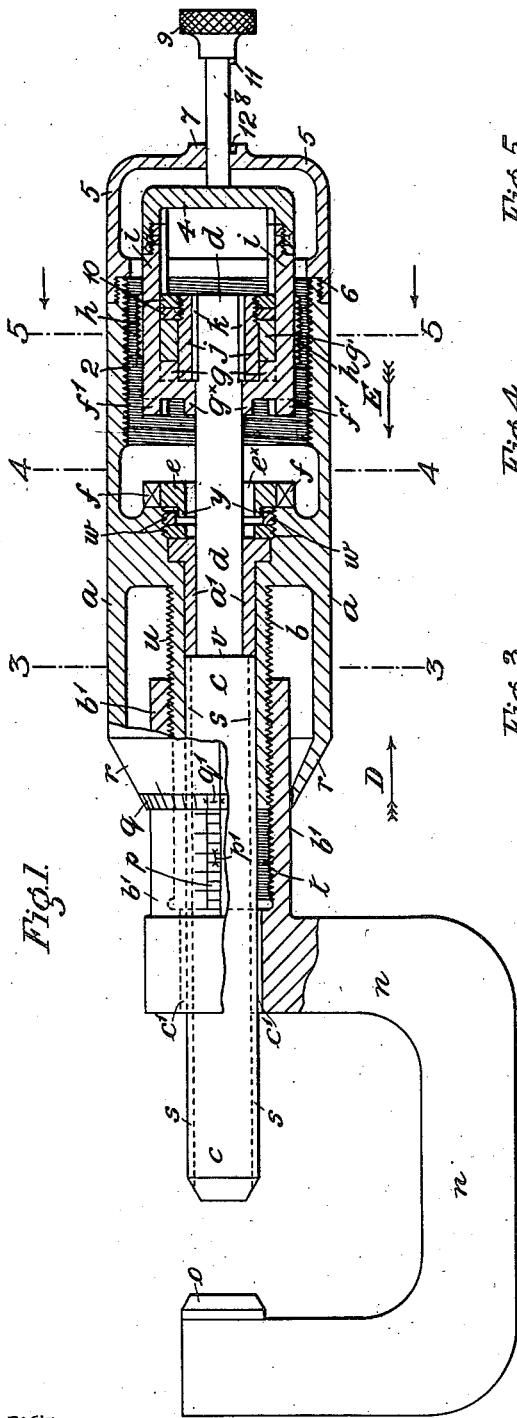
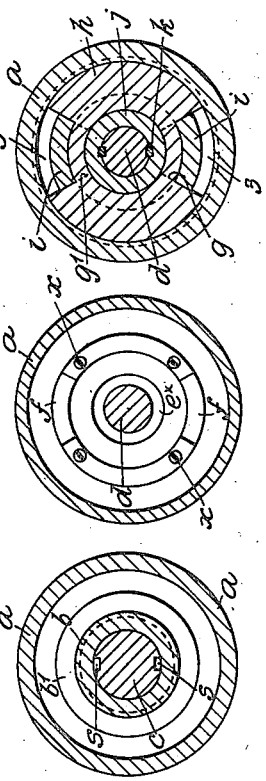
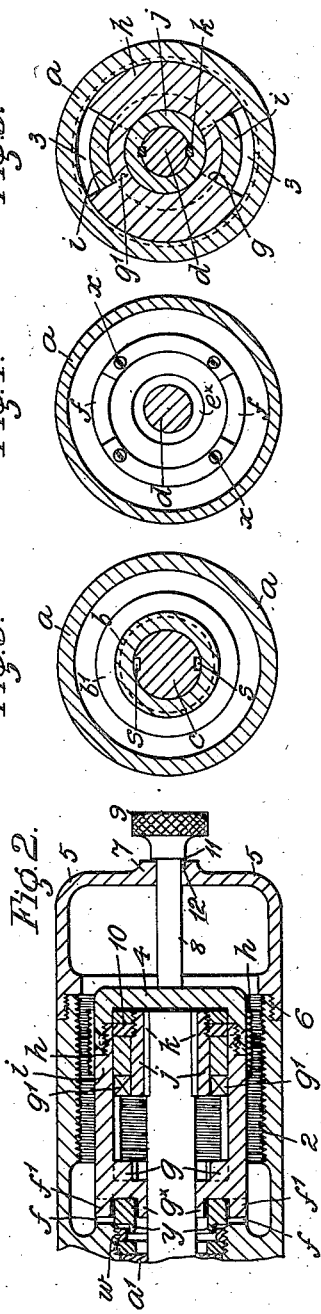
Witnesses.
Inventor.
Albert Charles May.

UNITED STATES PATENT OFFICE.

ALBERT CHARLES MAY, OF LONDON, ENGLAND.

MICROMETER-GAGE.

1,133,652.  Specification of Letters Patent.  Patented Mar. 30, 1915.

Application filed April 11, 1914. Serial No. 831,131.

*To all whom it may concern:*

Be it known that I, ALBERT CHARLES MAY, a subject of the King of Great Britain, residing at London, England, engineer, have invented new and useful Improvements in Micrometer-Gages, of which the following is a specification.

This invention relates to new or improved adjusting mechanism for establishing readings or measurements on instruments such as micrometer gages, for example, but my improvements are equally applicable to other measuring instruments and apparatus where a varying speed of movement of the ram, measuring element, or its equivalent, is desired. I will therefore content myself in describing my improvements as applied to a micrometer gage, for example, and by means of clutches and retarding mechanism I am enabled to make micrometric measurements of a varying nature according to circumstances in a quicker and more accurate manner than heretofore by the operation of the one graduated barrel as commonly employed in this class of instrument.

Compound micrometer calipers have already been devised whereby by means of one set of screw gear a coarse adjustment has been obtained or registered, and by another set of screw gear mounted practically in parallel with the first named screw gear, and independently operated, a finer adjustment has been obtained or registered.

By my improved mechanism I am enabled to obtain similar variable adjustment or measurement by the manipulation of the one graduated barrel acting directly on the ordinary micrometer screw gear, and the interposition of a clutch device whereby the second or retarding screw gear is put into operation and a finer adjustment obtained according to the difference in the pitch of the threads employed by the manipulation of the same barrel. The arrangement of mechanism simplifies the construction of micrometer gages and extends the scope of utility; affording in the one intrument a simple and convenient means of more minute adjustment than has been obtainable heretofore, and very concise and accurate readings of the micrometric measurements desired, the manipulation being always carried out by the rotation of the one graduated barrel.

In order that my invention may be clearly understood, I will now describe the same with the aid of the accompanying sheet of drawings in which—

Figure 1 is a longitudinal sectional elevation of a micrometer gage constructed in accordance with my invention; Fig. 2 a similar view of a part of the same instrument showing parts in different positions; Figs. 3, 4 and 5 are cross sections on line 3—3, 4—4 and 5—5 respectively of Fig. 1 viewed as indicated by the plain arrows in that figure.

Similar letters of reference relate to like parts in all the figures of the drawings.

Referring to the drawings, $n$ represents the yoke carrying the ordinary anvil $o$ between which point and the end of the ram $c$ the measurements are taken.

On the outside of the extension $b^1$ of the yoke $n$ is provided a scale $p$ as may be decided, which of course reads with the scale marked $q$ on the conical end $r$ of the barrel $a$.

In the example given each unit $p^1$ of the scale $p$ is presumed to represent $\frac{1}{40}$th of an inch, and each unit $q^1$ of the scale $q$ $\frac{1}{1000}$th of an inch, that is to say, the conical end $r$ is divided into 25 equal parts. Within the yoke $n$ is provided one or more keys $c^1$ which fit into grooves $s$ in the ram $c$ to prevent the rotary movement thereof. The extension $b^1$ is provided with an internal thread $t$ which engages with an external thread $u$ provided on the hollow elongated boss $b$ forming part of the barrel $a$, and free to rotate on the ram or central spindle $c$. These parts as described form a modification of the ordinary screw-threaded gear commonly employed in micrometer gages.

Next to the shoulder $v$ and around the reduced extension $d$ of ram $c$ is mounted the ferrule or sleeve $a^1$ which is secured to but free to rotate, within the barrel $a$ by means of the lock-nuts $w$. Adjacent to this sleeve $a^1$ and in the interior of the barrel $a$ is provided the one half of the clutch $f$ (female end) which is used for the coarse adjustment or measurement to be registered as hereinafter more fully described. This portion of the clutch $e$ surrounds the ram or central spindle extension $d$, and is secured to the intermediate wall in the barrel $a$ by means of screws $x$, as shown clearly in Fig. 4, and the whole may be kept central by means of the little boss $y$ which snugly fits the interior of the lock-nuts $w$ and the bore $e^x$ provides a bearing for $g^x$ thereby maintaining the concentricity of the parts.

The extension or back end of the barrel $a$ is provided with an internal screw-thread 2, which is of a different pitch to that referred to at $t$. Within this screw-thread is provided the operating nut $h$ which is put in gear for the purpose of effecting a fine adjustment of the ram or central spindle $c$, $d$ by means of clutch gear $g$, $g^1$, as shown in engagement in Fig. 1.

Through suitable holes or slots 3, Fig. 5, provided in the nut $h$ pass the longitudinal arms $i$ which carry the male portions $f^1$ and $g$ of the two clutches. These arms $i$ are connected together by means of the bridle-piece 4, and are inclosed within the barrel by means of the cap or cover 5 which may be screw-threaded as at 6 and provided with a central bearing or boss 7 through which the spindle 8 passes and may be operated by the milled head 9 for the purpose of putting one or other of the clutch gear into operation.

A small key or projection 11 is provided on the spindle 8 which engages with a corresponding notch 12, or is in line therewith, to insure the engagement of the respective clutches $f$, $f^1$ and $g$, $g^1$ when the scale $q$ is at zero.

To the back end of the ram or central spindle extension $d$ is secured a ferrule or sleeve $j$ by means of the keys $k$, and the beforementioned nut $h$ is free to rotate thereon, the female portion $g^1$ of the clutch being provided at the left hand end, and the whole being retained in position by means of lock-nuts 10.

If now only a coarse adjustment or measurement is required, and presuming in this case that 40 threads to the inch are employed at $t$, the clutch $f$, $f^1$ is in the position shown in Fig. 2 the milled head 9 having been moved to the left for the purpose of disengaging the clutch $g$, $g^1$ and engaging, as before stated, clutch $f$, $f^1$, the barrel $a$ will now work precisely as an ordinary micrometer gage, the retarding mechanism being locked in the hollow end of the barrel $a$ by means of the engagement of the clutch $f$, $f^1$ and the arms $i$ extending through the nut $h$. The whole will rotate about the ram $c$ and extension $d$, and as the clutch $g$, $g^1$ is out of gear the nut $h$ is free to rotate about and slide on the sleeve or ferrule $j$, this latter being secured against relative rotary movement upon the spindle $d$. The clutch $f$, $f^1$ is now in gear and rotates with the barrel $a$, and no movement of arms $i$ with respect to the barrel $a$ due to the screw-thread 2 can take place, and longitudinal movement is prevented by the flange formed by the part $g^1$ of the clutch and the lock-nuts 10. The said ram is moved simply by the engagement of the thread $u$ working in the hollow extension $b^1$ of the yoke $n$, registering the measurement as in the ordinary micrometer gage according to the pitch of the thread employed at $t$. If more accurate or fine adjustment or measurement is required, the micrometer is used as above described setting the same to the nearest $\frac{1}{40}$th of an inch, the scale $q$ being at zero, and after taking note of the reading on the scale $p$ the clutch $g$, $g^1$ is put into gear as shown in Fig. 1, whereby the nut $h$ is locked to the ferrule or sleeve $j$ attached to the ram $c$ or central spindle extension $d$.

It will be observed that the ram $c$ is prevented from rotating by means of the keys $c^1$, therefore the barrel $a$ will rotate on the nut $h$ as a fixed nut and at the same time will move the ram $c$ in a contrary direction to that produced by the thread $t$ connecting the parts $b$ and $b^1$. The combined movements produced by the engagement of the parts $b^1$ and $b$ and the thread 2 of the barrel $a$ with the nut $h$ has a retarding effect on the ram $c$, and according to the differences adopted in the pitch of the threads employed, so may this retarding effect be increased or decreased as desired. The effect therefore of turning the barrel $a$ in one direction is to project the ram $c$ forward in the direction of the feathered arrow D, while at the same time the effect of the direct engagement of the screw-thread 2 with the fixed nut $h$ is to project the ram in the opposite direction as indicated by the feathered arrow E, thus producing a retarding influence on the ram. It follows too that when the clutches $g$, $g^1$ are in gear for effecting these finer measurements in use a space is formed between the end of the ferrule or sleeve $a^1$ and the spindle or ram $c$ at the shoulder $v$. The ferrule or sleeve $a^1$ acts as a stop for the ram $c$ on the return of the fine adjusting mechanism back to the original reading. That is to say the ram $c$ is brought back to contact with the ferrule or sleeve $a^1$ before disengagement or engagement of the clutches $g$, $g^1$ or $f$, $f^1$. It may be observed that in the example it is presumed that the thread on the forward part of the barrel $a$ is an external right-handed thread (as shown) with a pitch of 40 to the inch, and that on the rear part of the said barrel $a$ an internal right-handed thread (as shown) 44⅘ to the inch. The obvious deduction therefore is that with 40 threads the ram will be moved $\frac{1}{40}$th of an inch per revolution of the barrel, and with 44⅘ threads the ram will be moved $\frac{9}{400}$ of an inch per revolution of the barrel $a$ in the opposite direction, the difference is therefore:

$$\left(\frac{1}{40}-\frac{9}{400}\right)=\left(\frac{10-9}{400}\right)=\frac{1}{400} \text{ of an inch,}$$

which may be recorded or registered by any convenient systems of scales as at $p$, $q$ for example. It will be understood that any fractional part of the $\frac{1}{400}$ of an inch thus measured may be readily registered, for example $\frac{1}{25}$ part thereof would mean an adjustment or measurement equal to $\frac{1}{10,000}$ of an inch or .0001.

If it is desired to separate the ram $c$ from the anvil $o$ by $\frac{1}{40}$th of an inch by the use of an ordinary micrometer movement as illustrated in Fig. 2, this will be effected by the rotation of the barrel $a$ one complete revolution, it being recorded on the horizontal scale $p$; if, however, a finer measurement is desired, say to separate the ram $c$ from the anvil $o$ by $\frac{1}{400}$ of an inch this is effected for every revolution of the barrel $a$ with conditions prevailing as illustrated in Fig. 1, that is to say the ratio of movement due to the different conditions illustrated in Figs. 1 and 2 is 10 to 1.

In the drawing and arrangement above described of a micrometer gage it will be observed that an external thread is employed for the coarse adjustment or measurement, and an internal thread for the fine adjustment or measurement, and that both threads are right-handed. It will, however, be obvious that internal or external threads may be empolyed for both coarse and fine measurements, and that the same effect may be obtained by right or left-handed threads as may be desired in coöperation with suitable clutch gear. Also that a second set of scales may be employed to register measurements of a fine character and that a vernier scale may be added to the instrument, these being mechanical expedients which do not depart from the scope of the appended claims, are so obvious that they do not require illustration.

Claims:

1. A micrometer gage comprising a yoke member, a ram slidably engaged within the yoke member, a graduated operating barrel rotatably mounted upon the yoke and having threaded connection therewith, means permitting free rotation of the said barrel upon the ram adapted to prevent relative longitudinal movement of the same, a nut mounted upon the ram and having threaded connection with the barrel, the pitch of the threads of this latter connection being different from the pitch of the threads of the connection between the barrel and the yoke member, and means by which the said nut may be secured to the ram for movement therewith or may be released from the ram and secured to the barrel for rotation therewith.

2. A micrometer gage comprising a yoke member, a ram slidably engaged within the yoke member, a graduated operating barrel rotatably mounted upon the yoke and having threaded connection therewith, means permitting free rotation of the said barrel upon the ram adapted to prevent relative longitudinal movement of the same, a nut mounted upon the ram and having threaded connection with the barrel, the pitch of the threads of this latter connection being different from the pitch of the threads of the connection between the barrel and the yoke member, clutch mechanism provided within the said barrel and being adapted to connect the said nut with the ram for rotation therewith or with the barrel for rotation with the same to be free with respect to the ram during this movement, and means by which the clutch mechanism may be shifted.

3. A micrometer gage comprising a yoke member, a ram slidably engaged within the yoke member, a graduated operating barrel rotatably mounted upon the yoke and having threaded connection therewith, means permitting free rotation of the said barrel upon the ram adapted to prevent relative longitudinal movement of the same, a nut mounted upon the ram and having threaded connection with the barrel, the pitch of the threads of this latter connection being different from the pitch of the threads of the connection between the barrel and the yoke member, fixed clutch members provided upon the said barrel and upon the ram, a movable clutch member mounted for axial sliding movement alone with respect to the said nut and being adapted for engagement with either of the said fixed clutch members, and an operating stem connected with the said movable clutch member and projecting exteriorly from the barrel.

4. A micrometer gage comprising a yoke member, a ram slidably engaged within the yoke member, a graduated operating barrel rotatably mounted upon the yoke and having threaded connection therewith, means permitting free rotation of the said barrel upon the ram adapted to prevent relative longitudinal movement of the same, a nut mounted upon the ram and having threaded connection with the barrel, the pitch of the threads of this latter connection being different from the pitch of the threads of the connection between the barrel and the yoke member, and means by which the said nut may be secured to the ram for movement therewith or may be released from the ram and secured to the barrel for rotation therewith, the said barrel and ram being provided with limiting shoulders adapted to abut each other.

In testimony whereof I have signed my name to this specification in the presence of two subscribing witnesses.

ALBERT CHARLES MAY.

Witnesses:
 STEPHEN EDWARD GUNYON,
 ALEXANDER EDWARD BECK.